JAMES M. HARCROW.
Improvement in Cotton Chopper and Cultivator.
No. 125,811. Patented April 16, 1872.
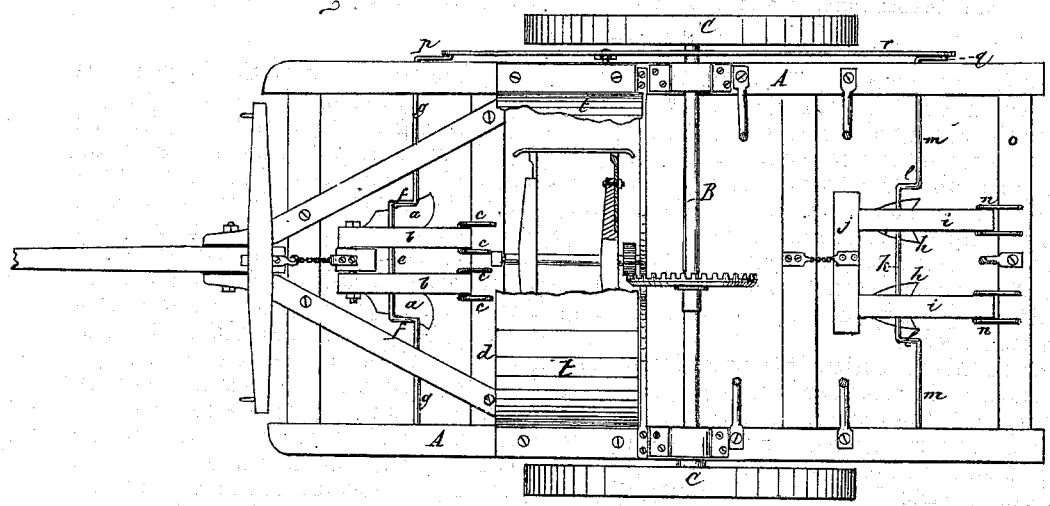
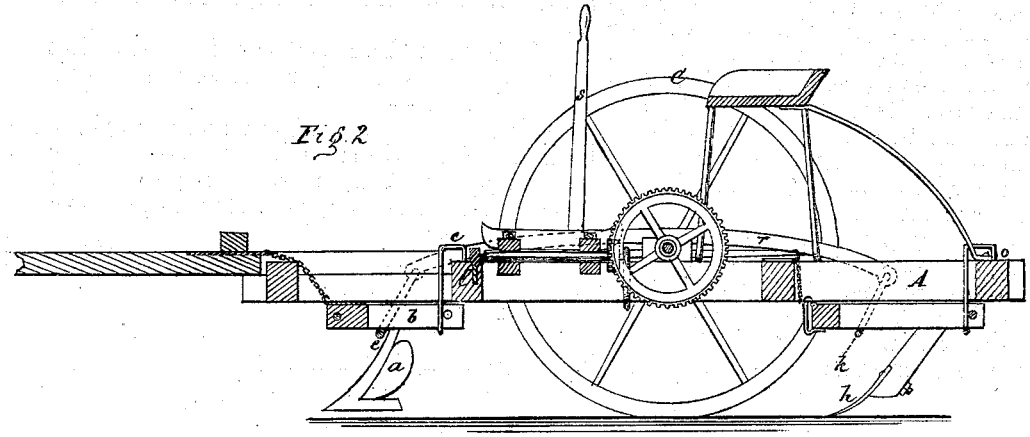

125,811

UNITED STATES PATENT OFFICE.

JAMES M. HARCROW, OF MARSHALL, TEXAS.

IMPROVEMENT IN COTTON-CHOPPERS AND CULTIVATORS.

Specification forming part of Letters Patent No. 125,811, dated April 16, 1872.

*To all whom it may concern:*

Be it known that I, JAMES M. HARCROW, of Marshall, in the county of Harrison and State of Texas, have invented a new and Improved Cotton-Chopper and Cultivator; and I do hereby declare the following to be a full, clear, and exact description of the same, reference being had to the accompanying drawing making a part of this specification, in which—

Figure 1 is a top view, and Fig. 2 is a longitudinal vertical section.

My object in this invention is to provide an improved machine for use in cultivation of the cotton-plant; and the invention consists in the arrangement forming the subject of the claim, and described hereinafter, in connection with other parts forming the complete machine.

Referring to the drawing, A is the frame of the machine, said frame being hung upon an axle, B, which is mounted in two transporting-wheels, C. The bearing-off plows are shown at $a$ $a$, the same being attached to beams $b$ $b$, which are supported at their rear ends in stirrups $c$ $c$, that are fastened to a cross-bar, $d$, of the frame A. At their front ends the beams $b$ rest upon the connecting-bar $e$ of a double crank, $f$, formed in a shaft, $g$, mounted crosswise of the frame A. The dirting-plows are shown at $h$ $h$. These are necessarily further apart than the bearing-off plows, and their beams, $i$ $i$, are connected at their front ends by a cross-bar, $j$. The beams $i$ rest on the connecting-bar $k$ of a double crank, $l$, formed in a shaft, $m$, also mounted crosswise of the frame A. The rear ends of the beams $i$ are supported in stirrups $n$, that are fastened to the hind cross-bar $o$ of the frame A. Cranks $p$ $q$ are formed on the end of the shafts $g$ $m$ respectively, which cranks are connected by a bar, $r$, to which is pivoted a lever, $s$, which is pivoted at its lower end to the side of the frame A. By moving the lever $s$ the shafts $g$ $m$ are rotated simultaneously, and the bearing-off and dirting-plow raised or lowered together. The chopper is situated in front of the driver's seat. An arched metal shield, $t$, is secured at its ends to the sides of the frame A, said shield rising above the chopper and exceeding it in width, so as to prevent the latter from injuring the driver or any other person having to do with the machine while in operation.

I am aware of, and do not claim the use of revolving cotton-choppers, nor of chains, pulleys, and crank-shafts to raise and lower plows; but

Having thus described my invention, what I claim as new, and desire to secure by Letters Patent, is—

The plow-beams $b$ and $i$ carrying the plows $a$ and $h$, the stirrups $c$ and $n$, crank-shafts $g$ $p$ and $m$ $q$, connecting-rod $r$, and the lever $s$, all constructed, arranged, and operating as shown and described.

J. M. HARCROW.

Witnesses:
R. W. BLALOCK,
WM. E. HENDERSON.